United States Patent

Nold et al.

[11] Patent Number: 6,102,559
[45] Date of Patent: Aug. 15, 2000

[54] MULTI-FUNCTION VEHICLE TAILLIGHT SYSTEM WITH UNITARY OPTIC

[75] Inventors: Jeffrey Paul Nold, Livonia, Mich.; David Allen O'Neil, Radnor, Pa.; Timothy Fohl, Carlisle, Mass.

[73] Assignee: Ford Motor Company, Dearborn, Mich.

[21] Appl. No.: 09/237,592

[22] Filed: Jan. 25, 1999

[51] Int. Cl.⁷ ..................................................... F21V 11/00
[52] U.S. Cl. ........................... 362/558; 362/31; 362/511; 362/541; 362/555; 340/468
[58] Field of Search ..................... 362/511, 540, 362/541, 555; 340/468, 815.42, 31

[56] References Cited

U.S. PATENT DOCUMENTS

| | | |
|---|---|---|
| 3,805,049 | 4/1974 | Frank et al. . |
| 4,257,084 | 3/1981 | Reynolds . |
| 4,460,940 | 7/1984 | Mori . |
| 5,136,483 | 8/1992 | Schoniger et al. . |
| 5,165,772 | 11/1992 | Wu . |
| 5,211,463 | 5/1993 | Kalmanash . |
| 5,295,047 | 3/1994 | Windross . |
| 5,375,043 | 12/1994 | Tokunaga . |
| 5,434,754 | 7/1995 | Li et al. . |
| 5,471,371 | 11/1995 | Koppolu . |
| 5,477,436 | 12/1995 | Bertling et al. . |
| 5,495,400 | 2/1996 | Currie ........................................ 362/32 |
| 5,570,951 | 11/1996 | Bertling et al. . |
| 5,590,945 | 1/1997 | Simms . |
| 5,695,269 | 12/1997 | Lippmann et al. . |
| 5,700,078 | 12/1997 | Fohl et al. . |
| 5,762,414 | 6/1998 | Montalan et al. . |
| 5,791,757 | 8/1998 | O'Neil et al. . |
| 5,857,770 | 1/1999 | Fohl et al. ................................ 362/511 |
| 5,890,796 | 4/1999 | Marinelli et al. ........................ 362/307 |
| 6,019,492 | 2/2000 | Ikegaya et al. .......................... 362/521 |

*Primary Examiner*—Sandra O'Shea
*Assistant Examiner*—John Anthony Ward
*Attorney, Agent, or Firm*—Charles H. Ellerbrock

[57] ABSTRACT

A taillight system for an automotive vehicle has an optic manifold mounted in a assembly defining a light emitting area, a first light source configured to provide illumination through the light emitting area, and a second light source configured to provide illumination through a predetermined portion of the light emitting area. The system has an illumination mode in which the first light source provides illumination of a first intensity in a first wavelength range through the light emitting area, a brake mode in which the first light source provides illumination of a second intensity in the first wavelength range through the light emitting area, and a backup mode in which the second light source provides illumination in a second wavelength range through the predetermined portion of the light emitting area, with or without the first light source providing illumination through the light emitting area, the second wavelength range including the first wavelength range.

14 Claims, 4 Drawing Sheets

6,102,559

MULTI-FUNCTION VEHICLE TAILLIGHT SYSTEM WITH UNITARY OPTIC

FIELD OF THE INVENTION

The present invention relates to vehicle lights in general, and more specifically to a vehicle taillight which provides multiple lighting functions.

BACKGROUND OF THE INVENTION

Conventional light transmission systems used for vehicle lighting, including vehicle tail lights, typically use a bulb and reflector system. In a bulb and reflector system, the filament of the bulb is placed at or near a focal point of a parabolic reflector. The light emitted by the bulb filament is collected by the reflector and reflected outward to form a light beam. A lens is used to shape the light beam into a specified pattern to satisfy vehicle lighting specifications. Typically, in an automotive application, a conventional bulb and reflector system collects and reflects only thirty percent of the light emitted from the bulb filament into the useful lighting area.

Bulb and reflector systems have several disadvantages, including aerodynamics and aesthetic styling. For example, the depth of the reflector along its focal axis and the height of the reflector in directions perpendicular to the focal axis greatly limited attempts at streamlining vehicle contours. Additionally, thermal energy given off by the bulb during operation must be dissipated so that the size of the reflector as well as the material used in its construction are additional factors complicating vehicle design with conventional lighting systems.

One approach to develop an automotive lighting system for use with streamlined body designs is proposed in U.S. Pat. No. 5,434,754, assigned to the assignee of the present invention, which discloses the combination of a fiber optic light guide which transmits light from a remote light source, through a light manifold, and to a reflector. Another approach, as shown in U.S. Pat. No. 5,700,078, also assigned to the assignee of the present invention, includes a remote laser light source coupled with a light transmitting fiber optic light pipe which illuminates a unitary thin sheet optic having an input section, a manifold sections, and a kicker section. While these approaches significantly advanced the state-of-the-art in vehicle design by eliminating bulky and inefficient reflectors and bulbs, the need for providing multiple colors for rear lighting requirements still remains.

This need, which is a further complicating factor in designing vehicle lighting systems, is for two or more colors to emanate from a single taillight assembly or from the same general area on the rear of a vehicle. Typically, a vehicle taillight assembly includes a taillight having a red lens for rear illumination and braking, a blinker having a yellow lens, and a backup light having a clear or white lens. Each of these usually requires a separate lens for covering a separate bulb and reflector system, thus increasing system cost and complexity.

One approach to the multi-color lighting problem is described in U.S. Pat. No. 5,136,483, which shows an illuminating element with a circumferential edge in which a plurality of LEDs are placed. The LEDs may be of various colors so that illumination of some, or all, may produce various colors. A drawback of this design, however, is the lack of ability to simultaneously illuminate separate portions of the light with two or more different colors. In the designs disclosed in U.S. Pat. No. 5,570,951 and U.S. Pat. No. 5,477,436, a plurality of light sources emit light of only one color through lens sections, or covers, which mix the colors to produce a uniform color. There is no provision to produce multiple colors through individual sections of the light for various lighting functions, however.

Therefore, it would be desirable to provide a taillight assembly for a vehicle which accommodates manufacturing and thermal considerations as well as the space limitations dictated by vehicular aerodynamic and styling requirements, and which provides multiple functions, such as rear illumination, brake lighting, backup lighting, or other signaling, without use of multiple lens.

SUMMARY OF THE INVENTION

The present invention overcomes the disadvantages of the related art by providing a multi-function taillight system for an automotive vehicle which has a assembly adapted for attachment to the vehicle and an optic manifold mounted within the assembly defining a light emitting area. The optic manifold has a front surface, an input section for receiving and dispersing light from a first light source in a general predetermined direction, and a back surface having a plurality of facets spaced apart in the general predetermined direction for redirecting light from the first light source through the front surface so as to provide illumination through the light emitting area. A second light source is configured to provide illumination through a predetermined portion of the light illuminating area.

The system has an illumination mode in which the first light source provides illumination of a first intensity in a first wavelength range through the light emitting area, a brake mode in which the first light source provides illumination of a second intensity in the first wavelength range through the light emitting area, a backup mode in which the second light source provides illumination in a second wavelength range including white light through the at least one predetermined portion of the light emitting area, the second wavelength range including the first wavelength range, and an off mode in which neither the first nor second light sources provide illumination. Light of the second wavelength range is emitted from the predetermined portion of the light emitting area when the system is in the backup mode, with or without the first light source providing illumination through the light emitting area, since the first wavelength range is contained in the second wavelength range.

An advantage of the present invention is vehicle taillight system which accommodates manufacturing and thermal considerations as well as the space limitations dictated by vehicular aerodynamic and styling requirements.

Another advantage is a taillight system which can provide simultaneous illumination of separate portions of a taillight footprint with different colored light to achieve multiple illumination and signaling functions without use of multiple lenses or reflectors.

A feature of the present invention is a unitary optical element through which light from two or more sources is directed to achieve multiple functions.

BRIEF DESCRIPTION OF THE INVENTION

These and other objects, advantages, and features of the present invention will be apparent to those skilled in the art upon reading the following description with reference to the accompanying drawings, in which.

DETAILED DESCRIPTION OF THE PREFERRED EMBODIMENT

Figure 1:
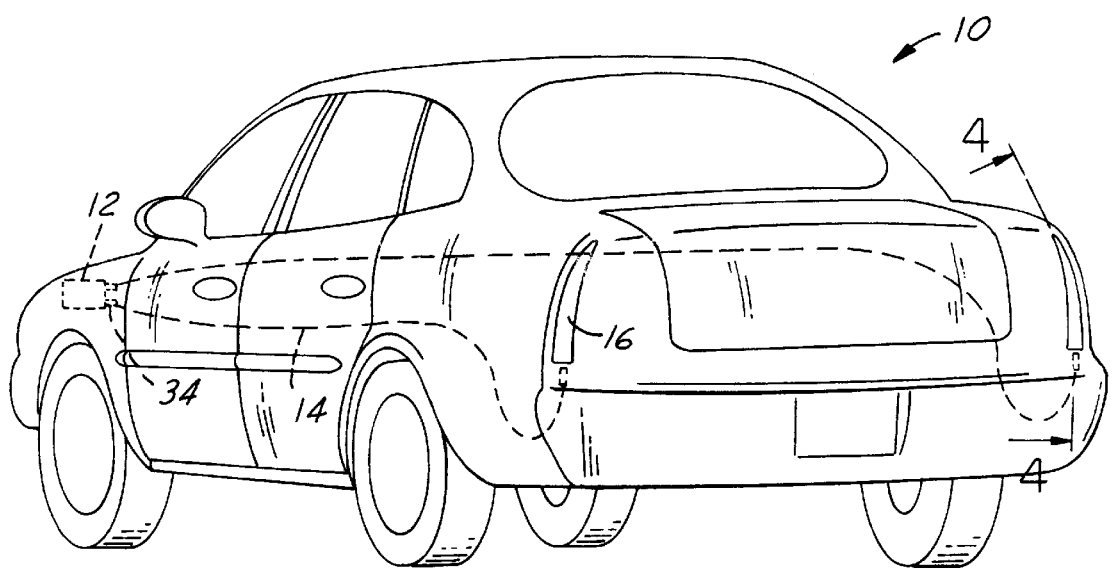
FIG. 1 is a perspective view of a rear end of an automotive vehicle having a taillight system according to the present invention attached thereto.

Turning now to the drawings, and in particular to FIG. 1 thereof, an automotive vehicle 10 is shown having a multi-function taillight system according to the present invention using, in combination, a remote light source 12, a fiber optic light guide 14, and a taillight assembly 16. The assembly 16 of the present invention is configured as a taillight, but the invention herein may also be used for other vehicle lighting applications, as those skilled in the art will recognize. The configuration of FIG. 1, therefore, is meant only to be illustrative and not limiting.

As shown in FIG. 1, the remote light source 12 is preferably a diode laser. The remote laser light source 12 is positioned in the automotive vehicle 10 with consideration given to vehicle design requirements and manufacturing ease relative to particular lighting objectives. A possible location for the remote laser light source 12 is in the engine compartment. A single diode laser source is preferably used, although other types of lasers as well as other types of remote light sources may be used without departing from the scope of the present invention. Alternatively, multiple laser sources or high intensity LED's may be positioned directly adjacent assembly 16.

Preferably, the fiber optic light guide 14 is utilized to transmit light from the remote laser light source 12 to the taillight assembly 16, as shown in FIG. 1. The light guide 14 has a first end 34 coupled to the light source 12 and a second end 36 adapted for connection to assembly 16 (FIG. 1). Because of the high brightness (candela per unit area) of the diode laser, a small diameter light guide 14 (0.1–1.0 mm) may be used to transmit light to the assembly 16.

Figure 3:
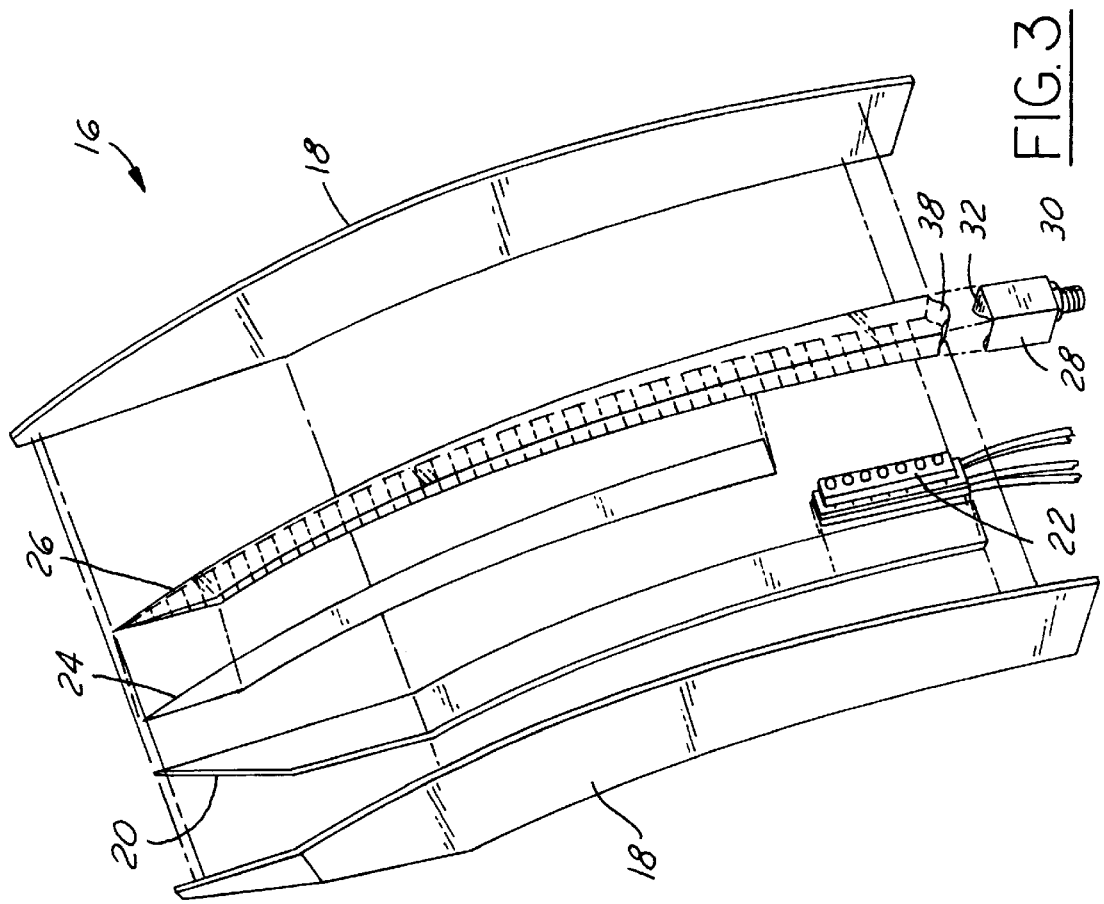
FIG. 3 is an exploded perspective view of the taillight system of FIG. 2.
Figure 2:
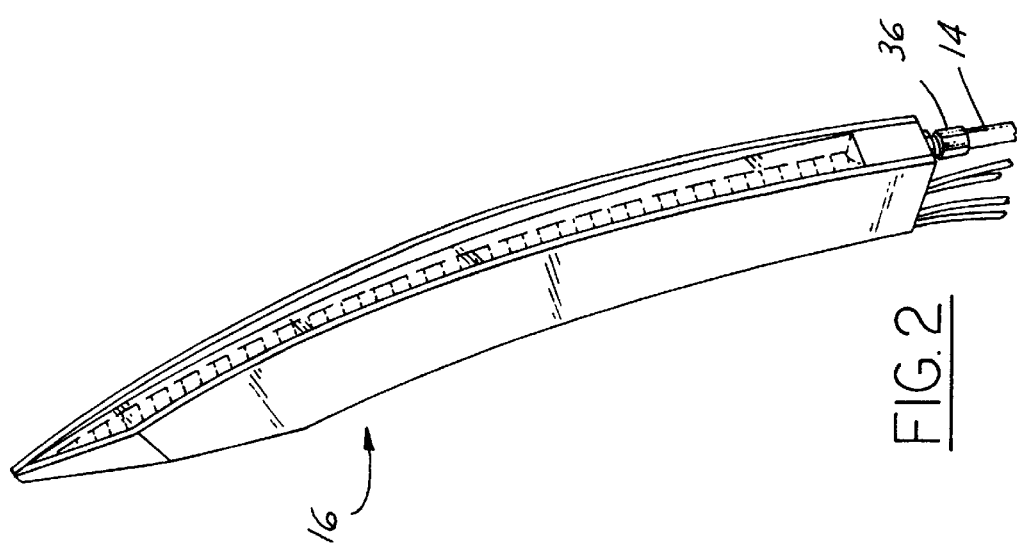
FIG. 2 is a perspective view of a taillight system according to one embodiment of the present invention.

Referring now to FIGS. 2 and 3, the taillight assembly 16 has housing 17 comprised of a pair of side walls 18 and a rear wall 20. A second light source 22 is attached to a bottom portion of the rear wall 20, and an upper facia member 24 is mounted above the second light source 22 and behind optic manifold 26. The optic manifold 26 is encased between the side walls 18 and is mounted in a support 28. The support 28 has a coupling 30 (FIG. 3) for receiving the second end 36 of the light guide 14 (FIG. 2). The support 28 also has a contoured upper surface 32 for receiving an input section 38 of the optic manifold 26 (FIG. 3).

Figure 4:
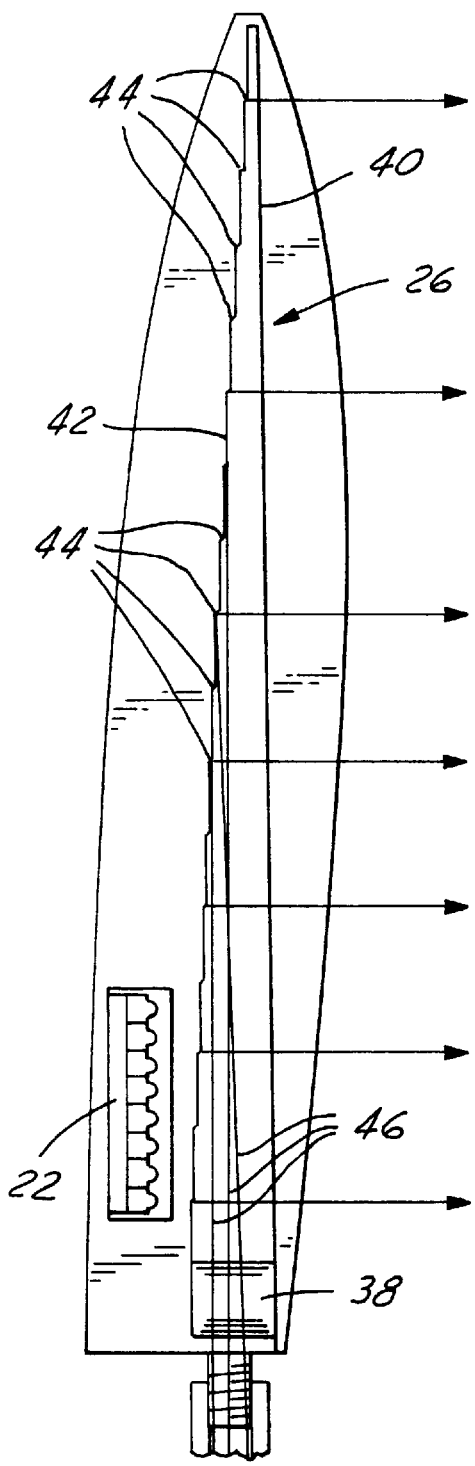
FIG. 4 is a sectional view taken along line 4—4 of FIG. 1 showing an illumination mode of the taillight system according to the present invention.

Turning now to FIG. 4, the unitary optic manifold 26 is seen having a front surface 40, an input section 38 for receiving and dispersing light from light source 12 via the fiber optic light guide 14, further discussed below. The optic manifold 26 also has a back surface 42 with a plurality of light reflecting facets 44 spaced apart in a direction generally parallel to light rays 46 emanating from the input section 38 (FIG. 4). The facets 44 reflect the rays 46 in a desired direction through the front surface 40 of the optic manifold 26. The shape of the facets 44 may vary depending upon the light pattern desired from the taillight assembly. The front surface 40 thus defines a light emitting area through which light is directed from either the first light source, that is, the remote light source 12, or the second light source 22 which, preferably, is a bank or line of light emitting diodes (LED's). The second light source 22 is configured to provide illumination through a predetermined portion of the light emitting area defined by the front surface 40 of the unitary optic manifold 26. The second light source 22 is preferably mounted adjacent the rear surface 42 of the optic manifold 26 so as to direct light therethrough.

Figure 5:
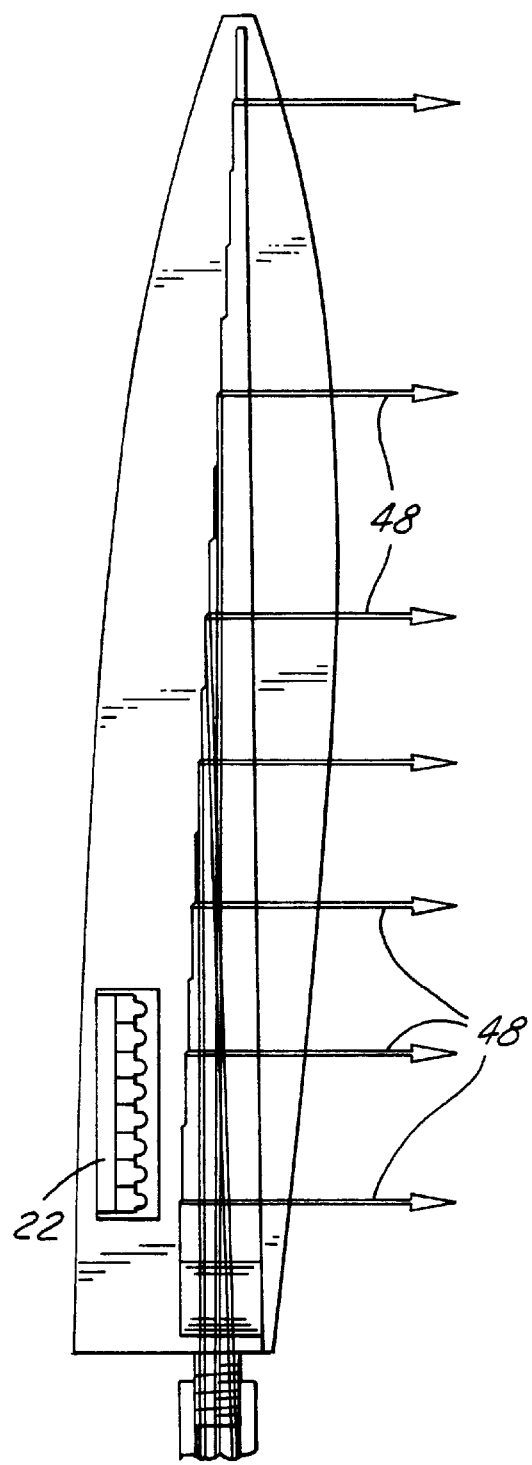
FIG. 5 is a sectional view similar to FIG. 4 but showing a braking mode of the taillight system according to the present invention.

The taillight system of the present invention has an illumination mode in which the first light source, that is, the remote laser light source 12, provides illumination of a first intensity in a first wavelength range through the light emitting area defined by the front surface 40 of the optic manifold 26 (FIG. 4). The first wavelength range typically will include in the red visible range so as to produce red illumination which is standard for the rear of automotive vehicles. As those skilled in the art will appreciate, the first wavelength range, as well as the first intensity of the illumination mode, is the subject of governmental regulations, and thus the ranges and minimum intensities can be found in such regulations. In a brake mode, the laser light source 12 produces illumination of a second intensity in the first wavelength range through the light emitting area defined by the front surface 40 of the optic manifold 16 (FIG. 5). The thicker light rays, generally indicated at reference numbers 48, designate light rays of a second, higher intensity than the first light intensity of the illumination mode of FIG. 4.

Figure 6:
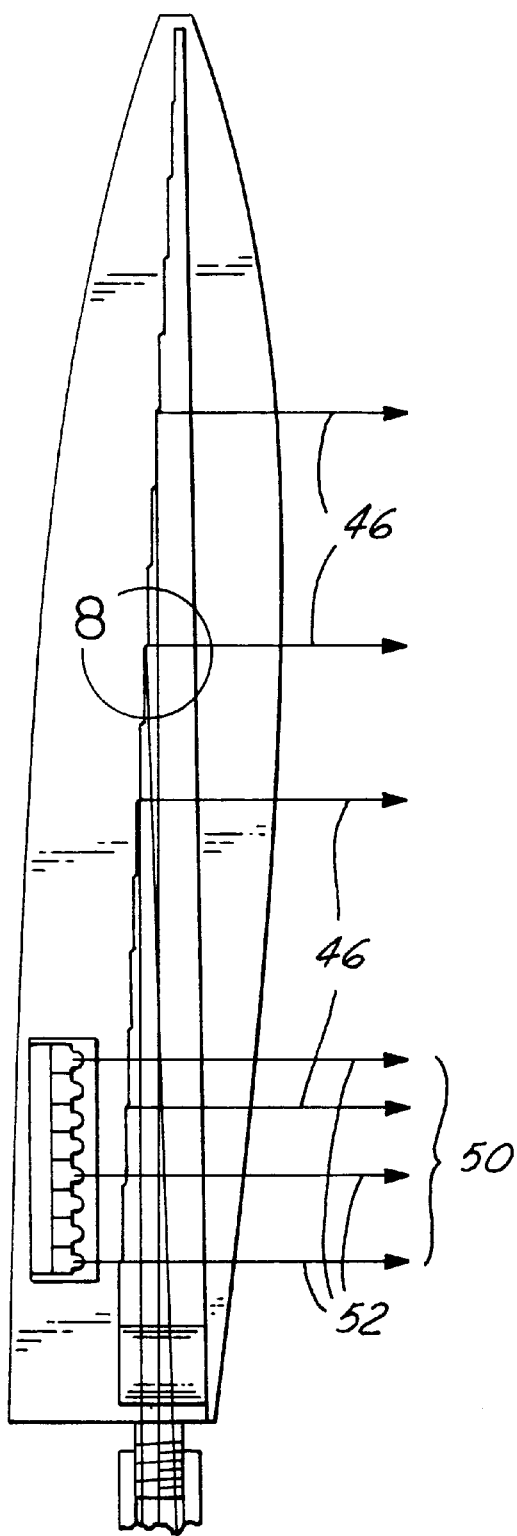
FIG. 6 is a sectional view similar to FIG. 5 but showing a backup mode of the taillight system according to the present invention.

In a backup mode, as seen in FIG. 6, the second light source, that is the bank of LED's 22, produces illumination in a second wavelength range, generally indicated by light rays 52, through a predetermined portion 50 of the light emitting area of the front surface 40 of the optic manifold 26. The second wavelength range includes the first wavelength range, and likewise is subject to governmental regulation. Preferably, the second wavelength range includes white light, that is, light in the visible spectrum for human beings. Light of the second wavelength ranges is emitted from the predetermined portion 50 of the light emitting area when the system is in the backup mode, with or without the first light source providing illumination through the light emitting area, since the first wavelength range is contained in the second wavelength range. That is, whether the first light source is providing illumination of either the first intensity or the second intensity, light of the second wavelength range will be emitted from the predetermined portion 50 of the light emitting area.

The taillight system of the present invention also has an off mode in which neither the first nor second light source provides illumination through the light emitting area.

Figure 7:
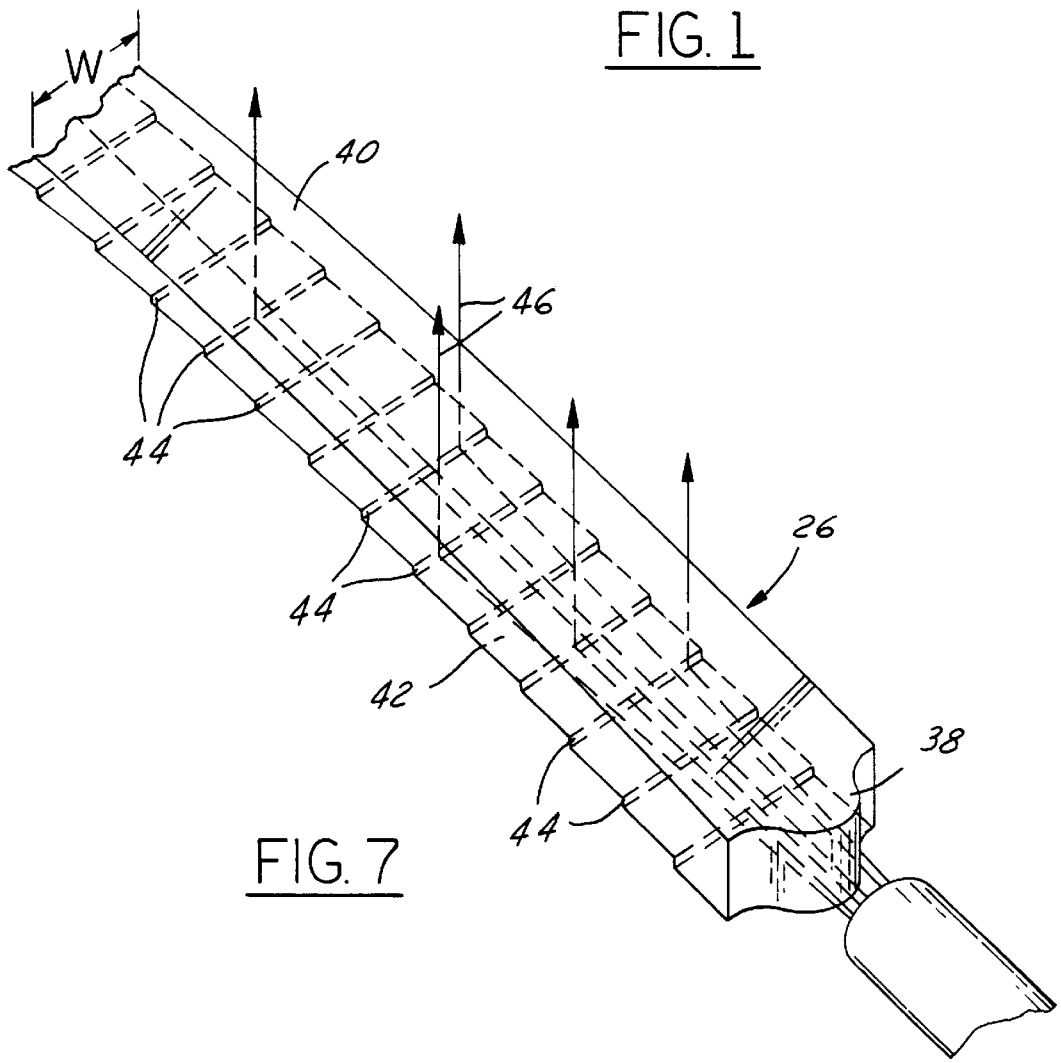
FIG. 7 is perspective view, partially cut-away, of an optic manifold for use with the taillight system according to the present invention.
Figure 8:
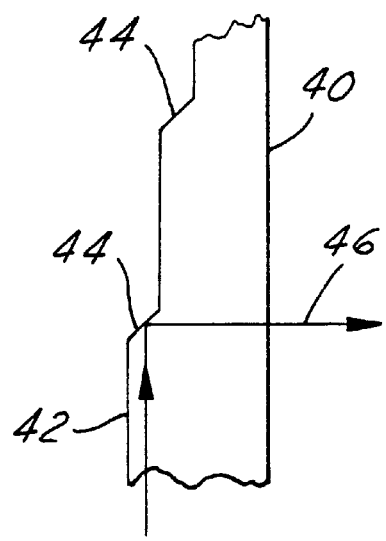
FIG. 8 is an enlarged view of a portion of FIG. 6 showing reflection of light from a facet in the optic manifold of the present invention.

The optic manifold 26 is preferably made of a transparent acrylic material or polycarbonate material, but other transparent materials may also be used. Preferably, the input section comprises a semi-cylindrical member integral with the unitary optic manifold 26 (FIG. 7) and serves to receive and disperse light from the first light source, for example, along the width, W, of the unitary optic manifold 26 (FIG. 7). Light thus dispersed travels lengthwise through the unitary element, or optic manifold 26, until reflecting from the facets 44 upon a rear surface 42 and through the front surface 40 (FIGS. 7 and 8).

The unitary element, or optic manifold 26, may take any shape desired by the designer and need not be limited to that shown in the drawings herein. Further, the location of the secondary light source, or bank of LED's 22, may be adjusted as desired so as to provide illumination in the second wavelength range through a predetermined portion of the light emitting area. The angle of the facets 44 with respect to the rear surface 42 may be varied so as to achieve a desired light pattern, intensity, or other desired objectives and specifications.

In use, light is emitted from the remote light source 12 received by fiber optic light guide 14 via light couplers, is transmitted through the fiber optic light guide 14 via total internal reflection (TIR), and is emitted at the second end 36 incident upon the input section 38 (FIGS. 1 and 7). As shown in FIGS. 4–6, the input section 38 disperses the light into a plurality of rays 46. The dispersed light rays travel through the optic manifold 26 until being redirected by the facets 44, as previously described. Some light rays may reflect off the sides 18 or the rear surface 24, which preferably have a reflective coating thereon, and exit the front surface 40.

Total internal reflection (TIR) of light occurs when an incident angle alpha of light upon surface of light exceeds a critical angle $\Pi_c$ given by the equation $\Pi_c = \arcsin n_1/n_2$ (where $n_1$ is the index of refraction of air and $n_2$ is the index of refraction of plastic.

Although the preferred embodiment of the present invention has been disclosed, various changes and modifications may be made without departing from the scope of the invention as set forth in the appended claims.

What is claimed is:

1. A taillight system for an automotive vehicle, comprising:

a assembly adapted for attachment to the vehicle;

an optic manifold mounted within the assembly and having a front surface defining a light emitting area, an input section on an end of the optic manifold, for receiving and dispersing light from a first light source generally parallel to the front surface in a general predetermined direction, and a back surface having a plurality of facets generally spaced apart in the general predetermined direction for redirecting light from the first light source through the front surface so as to provide illumination through the light emitting area;

a second light source configured to provide illumination through a predetermined portion of the light illuminating area; and wherein the system has:

an illumination mode in which the first light source provides illumination of a first intensity in a first wavelength range through the light emitting area;

a brake mode in which the first light source provides illumination of a second intensity in the first wavelength range through the light emitting area;

a backup mode in which the second light source provides illumination in a second wavelength range through the at least one predetermined portion of the light emitting area, with or without the first light source providing illumination through the light emitting area, the second wavelength range including the first wavelength range; and an off mode in which neither the first nor second light sources provide illumination.

2. The taillight system of claim 1 wherein the first light source is located on the vehicle at a location outside the assembly.

3. The taillight system of claim 2 wherein the first light source comprises at least one a diode laser.

4. The taillight system of claim 1 wherein the second light source comprises at least one light emitting diode (LED).

5. The taillight system of claim 1 wherein the second light source comprises a bank of light emitting diodes (LEDs) mounted adjacent the rear surface of the optic manifold.

6. The taillight system of claim 1 wherein the second wavelength range includes comprising white light.

7. The taillight system of claim 1 wherein the second wavelength range includes comprising the visible spectrum.

8. The taillight system of claim 1 wherein the input section comprises a semi-cylindrical member integral with the optic manifold.

9. A taillight system for an automotive vehicle, comprising:

a assembly adapted for attachment to the vehicle;

an optic manifold mounted within the assembly and having a front surface defining a light emitting area, an input section on an end of the optic manifold for receiving and dispersing light from a first light source generally parallel to the front surface in a general predetermined direction, and a back surface having a plurality of facets spaced apart in the general predetermined direction for redirecting light from the first light source through the front surface so as to provide illumination through the light emitting area;

a second light source configured to provide illumination through a predetermined portion of the light emitting area;

wherein the system has:

an illumination mode in which the first light source provides illumination of a first intensity in a first wavelength range through the light emitting area;

a brake mode in which the first light source provides illumination of a second intensity in the first wavelength range through the light emitting area;

a backup mode in which the second light source provides illumination in a second wavelength range including white light through the at least one predetermined portion of the light emitting area, the second wavelength range including the first wavelength range; and an off mode in which neither the first nor second light sources provide illumination; and wherein light of the second wavelength range is emitted from the predetermined portion of the light emitting area when the system is in the backup mode, with or without the first light source providing illumination through the light emitting area, since the first wavelength range is contained in the second wavelength range.

10. The taillight system of claim 9 wherein the first light source is located in the vehicle at a location remote from the assembly.

11. The taillight system of claim 10 wherein the first light source comprises at least one a diode laser.

12. The taillight system of claim 9 wherein the second light source comprises a bank of light emitting diodes (LEDs) mounted adjacent the rear surface of the optic manifold.

13. The taillight system of claim 9 wherein the input section comprises a semicylindrical member integral with the optic manifold.

14. The taillight system of claim 9 wherein the optic manifold is made of a transparent acrylic material.

* * * * *